(12) United States Patent
Mizumoto et al.

(10) Patent No.: US 10,717,830 B2
(45) Date of Patent: Jul. 21, 2020

(54) POLYAMIDE RESIN COMPOSITION FOR SLIDE FASTENER, SLIDE FASTENER COMPONENT, AND SLIDE FASTENER PROVIDED WITH SAME

(71) Applicant: YKK Corporation, Tokyo (JP)

(72) Inventors: Kazuya Mizumoto, Kurobe (JP); Hironobu Wakasa, Kurobe (JP); Yasuhiro Yokogoshi, Kurobe (JP); Norihide Ozaki, Kurobe (JP)

(73) Assignee: YKK Corporation (JP)

( * ) Notice: Subject to any disclaimer, the term of this patent is extended or adjusted under 35 U.S.C. 154(b) by 92 days.

(21) Appl. No.: 16/094,311

(22) PCT Filed: May 13, 2016

(86) PCT No.: PCT/JP2016/064353
§ 371 (c)(1),
(2) Date: Oct. 17, 2018

(87) PCT Pub. No.: WO2017/195363
PCT Pub. Date: Nov. 16, 2017

(65) Prior Publication Data
US 2019/0135994 A1    May 9, 2019

(51) Int. Cl.
*A44B 19/26* (2006.01)
*C08K 7/02* (2006.01)
(Continued)

(52) U.S. Cl.
CPC ............... *C08J 5/04* (2013.01); *A44B 19/24* (2013.01); *A44B 19/26* (2013.01); *B29D 5/02* (2013.01);
(Continued)

(58) Field of Classification Search
CPC .......................... A44B 19/26; A44B 19/262
See application file for complete search history.

(56) References Cited

U.S. PATENT DOCUMENTS

2015/0017458 A1*    1/2015    Mizumoto ............... B29D 5/02
428/458

FOREIGN PATENT DOCUMENTS

| JP | 2-051536 A    | 2/1990 |
| JP | 2005-160677 A | 6/2005 |

(Continued)

OTHER PUBLICATIONS

International Preliminary Report on Patentability, PCT Patent Application No. PCT/JP2016/064353, dated Nov. 22, 2018.
(Continued)

*Primary Examiner* — Jack W Lavinder
(74) *Attorney, Agent, or Firm* — Kilpatrick Townsend & Stockton LLP (57) ABSTRACT

Provided is a polyamide resin composition for a slide fastener that includes at least one polyamide resin and reinforcing fibers, wherein a total mass of the polyamide resin and the reinforcing fibers accounts for 90% by mass or more of the composition; wherein poly(m-xylylene adipamide) (MXD 6) accounts for 60% by mass or more of the polyamide resin; wherein reinforcing fibers account for 45 to 70% by mass of the total mass of the polyamide resin and the reinforcing fibers; wherein both first reinforcing fibers having a fiber diameter of from 5 to 7 μm and second reinforcing fibers having a fiber diameter larger than that of the first reinforcing fibers by more than 2 μm account for 90% by mass or more of the reinforcing fibers; and wherein the first reinforcing fibers account for 20% by mass or more and less than 50% by mass of the reinforcing fibers.

15 Claims, 3 Drawing Sheets

(51) Int. Cl.
*C08J 5/04* (2006.01)
*A44B 19/24* (2006.01)
*B29D 5/02* (2006.01)
*B29K 77/00* (2006.01)

(52) U.S. Cl.
CPC ......... *A44B 19/262* (2013.01); *B29K 2077/10* (2013.01); *C08J 2377/06* (2013.01)

(56) References Cited

FOREIGN PATENT DOCUMENTS

| | | |
|---|---|---|
| JP | 4517277 B | 8/2010 |
| JP | 2014/041526 A | 3/2012 |
| WO | 2013/098978 A1 | 7/2013 |
| WO | 2015/049753 A1 | 4/2015 |
| WO | 2015/155861 A1 | 10/2015 |

OTHER PUBLICATIONS

International Search Report, PCT Patent Application No. PCT/JP2016/064353, dated Jul. 26, 2016.

* cited by examiner

POLYAMIDE RESIN COMPOSITION FOR SLIDE FASTENER, SLIDE FASTENER COMPONENT, AND SLIDE FASTENER PROVIDED WITH SAME

TECHNICAL FIELD

The present invention relates to a polyamide resin composition for a slide fastener. The present invention also relates to a slide fastener resin component made of such a resin composition. Further, the present invention relates to a slide fastener comprising such a component.

BACKGROUND ART

Slide fasteners are opening and closing tools for articles which are used in daily necessities such as clothing, bags, footwear and household goods, as well as in industrial goods such as water storage tanks, fishing nets and spacesuits.

Figure 1:
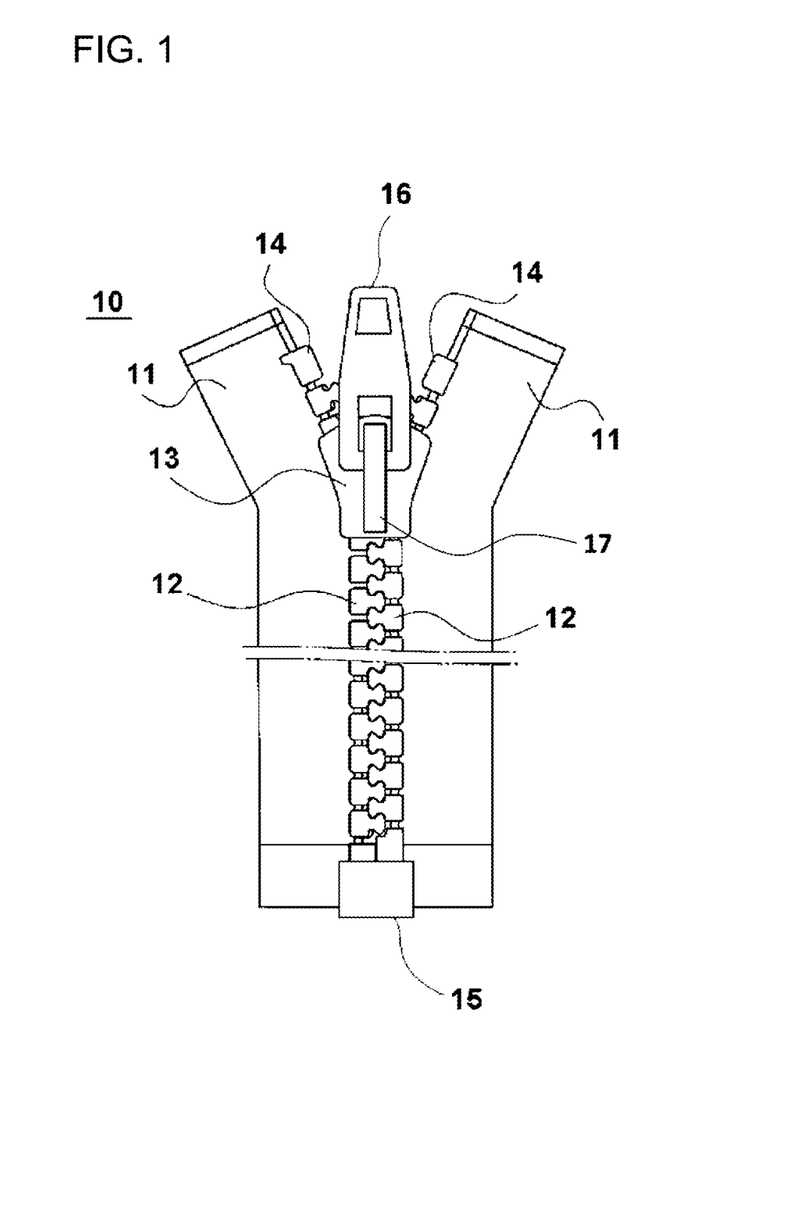
FIG. 1 is a front view showing a structural example of a slide fastener according to the present invention.

FIG. 1 shows a structural example of a slide fastener. A slide fastener 10 is mainly composed of three components: a pair of elongated tapes 11; a number of elements 12 that are engaged portions of the fastener attached along one side edge of each tape; and a slider 13 for controlling the opening and closing of the fastener by engaging and disengaging the elements 12. Furthermore, the slide fastener can be provided with a top stop 14 and an opener 15 in order to prevent the slider 13 from falling off, and can attach a pull tab 16 as well as a pull tab cover 17 for fixing the pull tab 16 to the slider, on the surface of the slider 13.

The components of the slide fastener are molded components which can be produced by injection molding, and are known to be manufacturable from polyamides.

Japanese Patent No. 4517277 (Patent Document 1) discloses that polyamide resins can be used for slide fastener components. This document mentions polyamide 6, polyamide 66, polyamide MXD6, polyamide 6T, polyamide 11, polyamide 12 and the like as the polyamide resins.

WO 2013/098978 A1 (Patent Document 2) discloses a polyamide resin composition containing from 30 to 50% by mass of polyamide and from 50 to 70% by mass of reinforcing fibers, wherein 50% by mass or more of the polyamide is an aliphatic polyamide. Further, it discloses that in terms of improvement of a plating property, 80% by mass or more of the polyamide may preferably be the aliphatic polyamide.

WO 2015/155861 A1 (Patent Document 3) proposes to use an aromatic polyamide having a low melting point (from 200 to 250° C.), in order to improve strength after dyeing for small components such as a pull tab cover, a pull tab, a top stop, a bottom stop and elements.

CITATION LIST

Patent Literatures

Patent Document 1: Japanese Patent No. 4517277 B
Patent Document 2: WO 2013/098978 A1
Patent Document 3: WO 2015/155861 A1

SUMMARY OF INVENTION

Technical Problem

Among the components of the slide fastener, the pull tab is a component for controlling the opening and closing of the slide fastener by moving the slider along the element row. Therefore, the pull tab is exposed to a tensile force or a torsional force every time the pull tab is grasped by a human hand and manipulated, so that high toughness enough to prevent breakage is required. Further, when providing the pull tab as an injection molded article made of a polyamide resin composition, it is often subjected to dyeing in terms of aesthetics. Therefore, the pull tab needs excellent dyeability as well as low decrease in strength by dyeing. However, the prior arts have not sufficiently studied material development focusing on the particularity of the pull tab. Therefore, there is room for improvement.

In view of the above circumstances, one of objects of the present invention is to provide a polyamide resin composition suitable as a material for producing a slide fastener component, in particular a pull tab, which exhibits excellent toughness, excellent dyeability and excellent strength after dyeing.

Solution to Problem

Aliphatic polyamide has good abrasion resistance. Applying a polyamide composition based on the aliphatic polyamide to a slider body provides significantly improved reciprocating opening and closing durability. Therefore, the aliphatic polyamide is suitable for the slider body. However, the aliphatic polyamide is unsuitable for components to which torsional forces are applied, such as the pull tab. Further, the aliphatic polyamide shows a significant decrease in strength after dyeing. Therefore, it would be preferable to apply to the pull tab MXD 6 disclosed in Patent Document 3 as an aromatic polyamide for providing excellent strength even after dyeing.

However, the pull tab is a small component and is smaller than the slider body. Thus, orientations of reinforcing fibers dispersed in the polyamide resin matrix are not aligned, so that an effect of improving strength by the reinforcing fibers cannot be sufficiently acquired. Although this problem is discussed in Patent Document 3, it is not intended to improve the reinforcing fibers, and it only improves the resin components to compensate for that drawback.

The present inventors have intensively studied structures of reinforcing fibers incorporated into a polyamide resin composition, in terms of largely exerting the effect of improving the strength by the reinforcing fibers. As a result, the present inventors have found that it is effective for solving the problems to incorporate certain reinforcing fibers having different fiber diameters into a polyamide resin composition based on MXD 6. The present invention has been completed on the basis of such findings.

In a first aspect, the present invention is a polyamide resin composition for a slide fastener, comprising at least one polyamide resin and reinforcing fibers, wherein a total mass of the polyamide resin and the reinforcing fibers accounts for 90% by mass or more of the composition;

wherein poly(m-xylylene adipamide) (MXD 6) accounts for 60% by mass or more of the polyamide resin;

wherein the reinforcing fibers account for from 45 to 70% by mass of the total mass of the polyamide resin and the reinforcing fibers;

wherein both first reinforcing fibers having a fiber diameter of from 5 to 7 μm and second reinforcing fibers having a fiber diameter larger than that of the first reinforcing fibers by more than 2 μm account for 90% by mass or more of the reinforcing fibers; and wherein the first reinforcing fibers account for 20% by mass or more and less than 50% by mass of the reinforcing fibers.

In one embodiment of the polyamide resin composition for the slide fastener according to the first aspect of the present invention, the polyamide resin further comprises an aliphatic polyamide having a water absorption rate lower than that of poly(m-xylylene adipamide) (MXD 6).

In another embodiment of the polyamide resin composition for the slide fastener according to the first aspect of the present invention, the aliphatic polyamide having the water absorption rate lower than that of poly(m-xylylene adipamide) (MXD 6) accounts for from 5 to 20% by mass of the polyamide resin.

In yet another embodiment of the polyamide resin composition for the slide fastener according to the first aspect of the present invention, poly(m-xylylene adipamide) (MXD 6) accounts for 85% by mass or more of the polyamide resin.

In yet another embodiment of the polyamide resin composition for the slide fastener according to the first aspect of the present invention, the polyamide resin composition contains less than 4% by mass of a pigment relative to the total mass of the polyamide resin and the reinforcing fibers.

In yet another embodiment of the polyamide resin composition for the slide fastener according to the first aspect of the present invention, the fiber diameter of the second reinforcing fibers is from 9 to 14 μm.

In yet another embodiment of the polyamide resin composition for the slide fastener according to the first aspect of the present invention, all of the at least one polyamide resin in the polyamide resin composition have a glass transition temperature of lower than or equal to 120° C.

In a second aspect, the present invention is a slide fastener component made of the polyamide resin composition for the slide fastener according to the present invention.

In one embodiment of the slide fastener component according to the second aspect of the present invention, the component comprises a pull tab.

In one embodiment of the slide fastener component according to the second aspect of the present invention, the component is dyed.

In a third aspect, the present invention is a slide fastener comprising the slide fastener component according to the present invention.

In one embodiment of the slide fastener according to the third aspect of the present invention, the slide fastener comprises a slider body made of a polyamide resin composition comprising: at least one polyamide resin; and reinforcing fibers, wherein a total mass of the polyamide resin and the reinforcing fibers accounts for 90% by mass or more of the composition; wherein an aliphatic polyamide accounts for 60% by mass or more of the polyamide resin; and wherein the reinforcing fibers account for from 45 to 70% by mass of the total mass of the polyamide resin and the reinforcing fibers.

In a fourth aspect, the present invention is a slide fastener comprising:
  a pull tab made of the polyamide resin composition for the slide fastener according to the present invention; and
  a slider body made of a polyamide resin composition comprising at least one polyamide resin and reinforcing fibers, wherein a total mass of the polyamide resin and the reinforcing fibers accounts for 90% by mass or more of the composition; wherein an aliphatic polyamide accounts for 60% by mass or more of the polyamide resin; and wherein the reinforcing fibers account for from 45 to 70% by mass of the total mass of the polyamide resin and the reinforcing fibers.

In one embodiment of the slide fastener according to the fourth aspect of the present invention, each of the polyamide resin composition configuring the pull tab and the polyamide resin composition configuring the slider body contains less than 4% by mass of a pigment relative to the total mass of the polyamide resin and the reinforcing fibers; and wherein the slide fastener satisfies a ratio $P_1:P_2=1.5:1$ to $4:1$, in which $P_1$ represents a concentration of the pigment relative to the total mass of the polyamide resin and the reinforcing fibers in the polyamide resin composition configuring the pull tab; and $P_2$ represents a concentration of the pigment relative to the total mass of the polyamide resin and the reinforcing fibers in the polyamide resin composition configuring the slider body.

In yet another embodiment of the slide fastener according to the fourth aspect of the present invention, both the pull tab and the slider body are dyed.

Advantageous Effects of Invention

The slide fastener component made of the resin composition for the slide fastener according to the present invention exhibits excellent toughness, excellent dyeability and excellent strength after dyeing. These properties are important as properties to be possessed by the pull tab. The resin composition for the slide fastener according to the present invention can be suitably used, in particular as a material for the pull tab. Further, a slide fastener in which the pull tab has high torsional strength and the slider has good reciprocating opening and closing durability is obtained by using, on one hand, the polyamide resin based on the aliphatic polyamide for the slider body, and using, on the other hand, the polyamide resin composition for the slide fastener according to the present invention for the pull tab.

DESCRIPTION OF THE PREFERRED EMBODIMENTS (1. Polyamide Resin Composition Suitable for Pull Tab)
<1-1 Poly(m-xylylene adipamide) (MXD 6)>

In one embodiment of a polyamide resin composition for a slide fastener according to the present invention, the polyamide resin contains 60% by mass or more of poly(m-xylylene adipamide) (hereinafter, also referred to as "MXD 6"). MXD 6 is particularly advantageous in that it can provide improved dyeability, high toughness, and improved strength even after dyeing. MXD 6 is one of aromatic polyamides, and it is also considered that other aromatic polyamide may be applied as a material for the pull tab. However, there is a problem that even if general aromatic polyamides can ensure improvement of the strength, the general aromatic polyamides have both a higher glass transition temperature and lower dyeability. Further, when the polyamide resin based on the aliphatic polyamide is used for the pull tab, it is difficult to obtain an effect of improving the strength by the reinforcing fibers, and when the polyamide resin absorbs water through a dyeing step, it is difficult to obtain a pull tab having a high torsional strength. The use of the polyamide resin based on MXD 6 will allow suppression of a decrease in torsional strength after dyeing.

The proportion of MXD 6 in the polyamide resin is preferably 70% by mass or more, and more preferably 80% by mass or more, and still more preferably 85% by mass or more. The proportion of MXD 6 in the polyamide resin may be 100% by mass, but as described below, blending a small amount of an aliphatic polyamide exhibiting a lower water absorption rate than MXD 6 into the polyamide resin can improve toughness after dyeing of the fastener component (for example, pull tab torsional strength in the case of the pull tab). Therefore, the proportion of MXD 6 in the polyamide resin is preferably 95% by mass or less, and more preferably 90% by mass or less.

<1-2 Aliphatic Polyamide Having Low Water Absorption Rate>

In a preferred embodiment of the polyamide resin composition for the slide fastener according to the present invention, a small amount of an aliphatic polyamide having a water absorption rate lower than MXD 6 as stated above can be incorporated. The incorporation of the predetermined aliphatic polyamide as a subcomponent provides an advantage that the torsional strength after dyeing is improved as compared with the case where MXD 6 is used alone.

While the water absorption rate of MXD 6 is typically 5% or more, the present inventors have found that fastener components having a high strength after dyeing was stably obtained by incorporating the aliphatic polyamide having a low water absorption rate than that of MXD 6. The water absorption rate of the aliphatic polyamide to be used is preferably less than 5%, more preferably 4% or less, and even more preferably 3.5% or less, and still more preferably 3% or less.

In the present invention, the water absorption rate means a saturated water absorption rate measured for a flat plate injected by injection molding, according to JIS K7209: 2000.

Regarding the proportion of the aliphatic polyamide resin exhibiting the predetermined water absorption rate in the polyamide resin, there is a preferable range within which an effect of improving the strength after dyeing is obtained. When the proportion of the aliphatic polyamide in the polyamide resin is 5% by mass or more, and preferably 10% by mass or more, the effect of improving the strength is significantly developed. However, the incorporation of an excessive amount of the aliphatic polyamide contrarily causes a decrease in the strength. Therefore, the proportion of the aliphatic polyamide is preferably 40% by mass or less, more preferably 30% by mass or less, and still more preferably 20% by mass or less in the polyamide resin.

The aliphatic polyamides refer to polyamides composed of an aliphatic backbone, and can be generally classified into those synthesized from aliphatic amines and aliphatic dicarboxylic acids as raw materials, or those synthesized from aliphatic w-amino acids or lactams thereof as raw materials.

The aliphatic diamines include linear or branched aliphatic diamines such as, for example, ethylenediamine, propylenediamine, butylenediamine, hexamethylenediamine, 2-methylpropanediamine, 3-methylpropanediamine, octamethylenediamine, decanediamine and dodecanediamine. The aliphatic dicarboxylic acids include linear or branched aliphatic dicarboxylic acids such as, for example, succinic acid, propanedioic acid, butanedioic acid, pentanedioic acid, adipic acid, heptanedioic acid, octanedioic acid, nonanedioic acid, decanedioic acid, dodecanedioic acid, undecanedioic acid, dimer acid, and hydrogenated dimer acid. The aliphatic w-amino acids include, for example, 6-aminohexanoic acid, 11-aminoundecanoic acid and 12-aminododecanoic acid, and the like. The lactams include ε-caprolactam, undecanelactam and lauryllactam, and the like.

A specific structure of the aliphatic polyamide typically includes, but not limited to, a polyamide having repeating monomer units or combinations thereof, represented by the following formula: —NHR$_1$NHC(=O)R$_2$C(=O)— or —NHR$_1$C(=O)—, in which R$_1$ and R$_2$ are the same or different groups and are each an alkylene group having at least 2 carbon atoms, and preferably an alkylene group having 2 to 12, more preferably 6 to 10 carbon atoms. Specific examples of the aliphatic polyamides include aliphatic polyamides synthesized by copolycondensation reaction of aliphatic diamines with aliphatic dicarboxylic acids, such as polytetramethylene adipamide (polyamide 46), polyhexamethylene adipamide (polyamide 66), polyhexamethylene azelamide (polyamide 69), polyhexamethylene sebacamide (polyamide 610), polyhexamethylene dodecanediamide (polyamide 612), polyheptamethylene pimelamide (polyamide 77), polyoctamethylene suberamide (polyamide 88), polynonamethylene azelamide (polyamide 99) and polydecamethylene azelamide (polyamide 109); as well as aliphatic polyamides synthesized by polycondensation reaction of w-amino acids or ring opening polymerization of lactams, such as poly(4-aminobutyric acid) (polyamide 4), poly(6-aminohexanoic acid) (polyamide 6), poly(7-aminoheptanoic acid) (polyamide 7), poly(8-aminooctanoic acid) (polyamide 8), poly(9-aminononanoic acid) (polyamide 9), poly(10-aminodecanoic acid) (polyamide 10), poly(11-aminoundecanoic acid) (polyamide 11), and poly(12-aminododecanoic acid) (polyamide 12). These may be used alone or in combination with two or more of these.

Furthermore, copolymers obtained by any combination of repeating units of the aliphatic polyamides can also be used. Such aliphatic copolyamides include, but not limited to, a caprolactam/hexamethylene-adipamide copolymer (nylon 6/6,6), a hexamethylene-adipamide/caprolactam copolymer (nylon 6,6/6), a hexamethylene-adipamide/hexamethylene-azelamide copolymer (nylon 6,6/6,9), and the like.

In terms of providing excellent strength even after water adsorption and availability of commercial products, among the aliphatic polyamides, at least one selected from the group consisting of polyamide 66 (PA 66), polyamide 610 (PA 610) and polyamide 612 (PA 612) is more preferred, polyamide 612 being more preferred. Thus, of the aliphatic polyamide components according to the present invention, these three kinds preferably account for at least 90% by mass, these three kinds more preferably account for at least 95% by mass, these three kinds even more preferably account for at least 99% by mass, and these three kinds even more preferably account for 100% by mass. Furthermore, of the aliphatic polyamide components according to the present invention, polyamide 612 preferably accounts for at least 90% by mass, polyamide 612 more preferably accounts for at least 95% by mass, polyamide 612 even more preferably accounts for at least 99% by mass, and polyamide 612 even more preferably accounts for 100% by mass.

It should be noted that all of the at least one polyamide resin in the polyamide resin composition, including MXD 6 and the aliphatic polyamide having the low water absorption rate, preferably have a glass transition point of 120° C. or less, and more preferably have a glass transition point of 110° C. or less in terms of dyeability and whiteness of a base color before dyeing. If using the polyamide having a higher glass transition point, for example a glass transition point of 120° C. or more, dyeing has to be carried out under elevated temperature conditions in order to intercalate a pigment between molecules. The dyeing requires a high-pressure container because the pigment is in aqueous medium and also tends to cause color unevenness. An increased amount of the pigment added is required for obtaining a clear white color. Further, the glass transition point is preferably 50° C. or more, and more preferably 60° C. or more. The glass transition point of 50° C. or more will make it difficult to cause a problem that mechanical properties is deteriorated in a normal temperature environment. In the present invention, the glass transition point of the polyamide resin of present invention is measured according to JIS K7121-1987.

<1-3 Reinforcing Fibers>

The strength of the pull tab can be reinforced by containing reinforcing fibers in the polyamide resin composition. Since it is expected that the polyamides improve affinity to the reinforcing fibers as compared with the polyesters, by surface treatment with a silane coupling agent, a titanate-based coupling agent or an aluminate-based coupling agent, or the like, the pull tab can acquire high rigidity without impairing the strength even if a large amount of the reinforcing fibers are added. More particularly, the concentration of the reinforcing fibers in the total mass of the reinforcing fibers and the polyamide resin is preferably at least 45% by mass, and more preferably at least 50% by mass. However, if the concentration of the reinforcing fibers is too high, formability will be deteriorated and the strength will also be reduced. Therefore, the concentration of the reinforcing fibers in the total mass of the reinforcing fibers and the polyamide resin is preferably 70% by mass or less, and more preferably 60% by mass or less.

The reinforcing fibers used in the present invention may include, but are not limited to, for example, organic fibers such as carbon fibers and aramid fibers, as well as inorganic fibers such as glass fibers, needle-shaped wollastonite and whiskers (e.g., a calcium titanate whisker, a calcium carbonate whisker, an aluminum borate whisker). For the reason that the strength can be improved while maintaining fluidity at a certain level or more, any one or more selected from the glass fibers, the aramid fibers and the carbon fibers are preferably used, the glass fibers being more preferred. These may be used alone or in combination with two or more kinds.

One embodiment of the polyamide resin composition for the slide fastener according to the present invention is characterized by incorporating predetermined reinforcing fibers having different fiber diameters. More particularly, it is preferable to incorporate first reinforcing fibers having a fiber diameter of from 5 to 7 μm and second reinforcing fibers having a fiber diameter larger than the first reinforcing fibers by more than 2 μm. The incorporation of the reinforcing fibers having different fiber diameters can achieve both excellent formability and excellent pull tab torsional strength. In terms of significantly developing the effect, the first reinforcing fibers and the second reinforcing fibers account for 90% by mass or more, and more preferably 95% by mass or more, and even more preferably 100% by mass, of the reinforcing fibers.

A higher content of the first reinforcing fibers in the reinforcing fibers tends to enhance the effect of improving the pull tab torsional strength. Therefore, the content of the first reinforcing fibers in the reinforcing fibers is preferably 20% by mass or more, and more preferably 25% by mass or more. However, an excessively high content of the first reinforcing fibers in the reinforcing fibers deteriorates the formability. Therefore, the content of the first reinforcing fibers in the reinforcing fibers is preferably less than 50% by mass, and more preferably 40% by mass or less, and still more preferably 35% by mass or less.

The reason why the fiber diameter of the first reinforcing fibers is from 5 to 7 μm is as follows. When fibers with the same weight are added, an excessively small fiber diameter will result in a larger specific surface area, which will lead to deteriorated fluidity and hence difficulty in forming into small products such as fasteners. Further, an excessively large fiber diameter will cause a problem that mechanical properties of the products are deteriorated. In particular, when the fiber diameter is larger, the orientations of fibers tend to be aligned in the longitudinal direction of the product, so that the product becomes weak against in-plane shear stress such as a pull tab torsion test. The fiber diameter of the first reinforcing fibers is preferably from 5.5 to 6.5 μm.

If a difference between the fiber diameters of the first reinforcing fibers and the second reinforcing fibers is too small, the effect of improving the pull tab torsional strength is not significantly developed. Therefore, the fiber diameter of the second reinforcing fibers is preferably larger than that of the first reinforcing fibers by more than 2 μm, and more preferably larger than that of the first reinforcing fibers by 3 μm or more, and even more preferably larger than that of the first reinforcing fibers by 4 μm or more. On the other hand, if the fiber diameter of the second reinforcing fibers is too large, the effect of improving the pull tab torsional strength is not developed, rather the pull tab torsional strength may be impaired. The fiber diameter of the second reinforcing fibers is preferably larger than that of the first reinforcing fibers by not more than 7 μm, more preferably larger than that of the first reinforcing fibers by not more than 6 μm, and even more preferably larger than that of the first reinforcing fibers by not more than 5 μm. The fiber diameter of the second reinforcing fibers may be, for example, from 9 to 14 μm.

Here, the fiber diameter refers to a diameter when determining the cross-sectional area of the reinforcing fiber and calculating its diameter regarding the cross-sectional area as a true circle.

The total content of the polyamide resin and the reinforcing fibers in the polyamide resin composition is preferably 90% by mass or more, and more preferably 95% by mass or more, in order to achieve the desired strength.

<1-4 Pigment and Other Additive>

Although the polyamide resins have less color reproducibility because they are sensitive to yellowing, the color reproducibility can be improved by adding a pigment. On the other hand, since an increased addition amount of the pigment causes problems that the strength is reduced and the high-density color does not appear during dyeing because of excessive whiteness, the addition of the pigment at a high concentration is not preferred. From the viewpoint of color reproducibility, the content of the pigment in the polyamide resin composition is preferably at least 0.5% by mass, and more preferably at least 1.0%, based on the total mass of the polyamide resin and reinforcing fibers. Further, from the viewpoint of deep color dyeability, the content of the pigment in the polyamide resin composition is preferably less than 4.0% by mass, and more preferably 3.5% by mass or less, and even more preferably 3.0% by mass or less, based on the total mass of the polyamide resin and reinforcing fibers. If the amount of the pigment is too much, the white color will be too strong, so that a red color will turn to a pink color for example, and it will be difficult to show a deep color. Examples of the pigment include, but not limited to, zinc sulfide, antimony oxide, titanium oxide, zinc oxide and the like, and zinc sulfide is preferred in terms of safety.

In view of a solid dyeing property with the slider body in the one-bath dyeing process, a ratio $P_1:P_2$ is preferably $P_1:P_2=1:1$ to 4:1, and more preferably $P_1:P_2=1.5:1$ to 4:1, and even more preferably $P_1:P_2=2:1$ to 3:1, in which $P_1$ represents a concentration of the pigment relative to the total mass of the polyamide resin and the reinforcing fibers in the polyamide resin composition for configuring the pull tab, and $P_2$ represents a concentration of the pigment relative to the total mass of the polyamide resin and the reinforcing fibers in the polyamide resin composition for forming the slider body. The pull tab with a higher content of MDX 6 has higher dyeability, whereas the slider body has a higher amount of the aliphatic polyamide incorporated and lower dyeability than the pull tab, as described below. Therefore, the incorporation of a higher amount of the pigment into the polyamide resin composition for the pull tab can lead to a higher solid dyeing property with the slider body in the one-bath dyeing process.

Besides, conventional additives such as heat stabilizers, weathering agents, hydrolysis resistant agents and antioxidants may be added to the polyamide resin composition, for example in a total amount of 10.0% by mass or less, and typically 5% by mass or less, and more typically 2% by mass or less.

<1-5 Melt Flow Rate>

The present invention preferably controls a melt flow rate (MFR) of the polyamide resin composition to be used. The MFR is changed influenced by the molecular weight of the polyamide and the content of the reinforcing fibers. An excessively low MFR deteriorates a filling rate upon injection molding of the fastener component due to deterioration of a flow property, which causes problems such as a decrease in yield and a prolonged molding cycle, and the like. On the other hand, an excessively high MFR causes problems of reduced strength, as well as a poor appearance due to development of flow unevenness resulting from broadening of the molecular weight distribution, or poor dimensional stability in summer environment due to the influence of water absorption resulting from the polymer components, and the like. Preferable MFR is from 5 to 40 g/10 min, more preferable MFR is from 8 to 30 g/10 min, and even more preferable MFR is from 10 to 25 g/10 min. In the present invention, the MFR is measured at 280° C. and under a measuring load of 2.16 kg, according to JIS K7210 (Method A). The use of the resin composition having the MFR within this range enables to produce formed components for a slide fastener having good formability and good quality stability with a high production efficiency.

(2. Polyamide Resin Composition Suitable for Slider Body)

For the slider body there are strong needs not only for the strength but also for reciprocating opening and closing durability. Further, the slider body is a relatively larger component among the fastener components and tends to produce the effect of improving the strength by the reinforcing fibers, and there is no need to worry about the reduced strength due to water absorption upon dyeing. Therefore, it is preferable that the polyamide used for the slider body is based on an aliphatic polyamide.

In one embodiment, the polyamide resin composition suitable for the slider body according to the present invention contains at least one polyamide resin and reinforcing fibers, in which the total mass of the polyamide resin and the reinforcing fibers accounts for 90% by mass or more in the composition, and in which the proportion of an aliphatic polyamide in the polyamide resin is 60% by mass or more, and in which the content of the reinforcing fibers in the total mass of the polyamide resin and the reinforcing fibers is from 45 to 70% by mass.

<2-1 Aliphatic Polyamide>

In one embodiment of the aliphatic polyamide suitable for the slider body according to the present invention, an aliphatic polyamide having a melting point of from 220 to 310° C. may be used. Since the slider body is a relatively larger component, it can be subjected to injection molding even with an elevated melting point. However, if an aliphatic polyamide with an excessively high melting point is used, the molding temperature is elevated, thereby tending to undergo yellowing. Therefore, it is preferable to use an aliphatic polyamide having a melting point of 310° C. or less, and more preferably an aliphatic polyamide having a melting point of 305° C. or less, and further more preferably an aliphatic polyamide having a melting point of 300° C. or less. Further, a polyamide resin having a lower melting point tends to decrease the strength and rigidity because the number of amide bonds per a unit molecular structure is reduced, thereby resulting in the form of a flexible chain. Therefore, it is preferable to use an aliphatic polyamide having a melting point of 220° C. or more, and more preferably an aliphatic polyamide having a melting point of 240° C. or more, and further more preferably an aliphatic polyamide having a melting point of 250° C. or more.

In one embodiment of the aliphatic polyamide suitable for the slider body according to the present invention, the proportion of the aliphatic polyamide having the melting point of from 220 to 310° C. in the polyamide resin is 60% by mass or more. The reciprocating opening and closing durability can be improved by increasing the proportion of the aliphatic polyamide to be incorporated. The slider body is a component that is most frequently subjected to friction caused by the sliding with the elements, and it is thus important to increase the reciprocating opening and closing durability. From the perspective of increasing the reciprocating opening and closing durability, the proportion of the aliphatic polyamide having the melting point of from 220 to 310° C. in the polyamide resin may preferably be 65% by mass or more, or may be 80% by mass or more, or may be 90% by mass or more, or furthermore it may be 100% by mass. However, the strength of the fastener components can be improved by formulating an aromatic polyamide having a defined melting point, as described below. Therefore, the proportion of the aliphatic polyamide having the melting point of from 220 to 310° C. in the polyamide resin may preferably be 90% by mass or less, and more preferably 80% by mass or less, and still more preferably 75% by mass or less.

The melting point of the aliphatic polyamide is defined to be a temperature of an endothermic peak top when measuring an endothermic energy amount by DSC (a differential scanning calorimetry). When using a plurality of aliphatic polyamides, a temperature of an endothermic peak top on the highest temperature side is defined to be the melting point.

Therefore, when using a plurality of aliphatic polyamides, it will be measured as a melting point based on the aliphatic polyamide having the highest melting point. However, even when using a plurality of aliphatic polyamides, all the melting points of the respective polyamide resins are preferably within the range as discussed above.

As with the aromatic polyamide, the melting points of these aliphatic polyamides can be adjusted by controlling their molecular weights. The melting point can be increased by increasing the molecular weight, and conversely, the melting point can be decreased by decreasing the molecular weight.

The molecular structure and specific examples of the aliphatic polyamide are as previously described in paragraph of "1. Polyamide Resin Composition Suitable for Pull Tab". The same is true for the preferable types of the aliphatic polyamides.

<2-2 Aromatic Polyamide>

In one embodiment of the polyamide resin composition suitable for the slider body according to the present invention, an aromatic polyamide can be incorporated. An effect of improving the strength can be expected by incorporating the aromatic polyamide.

Since the slider body is a relatively larger component, it can be subjected to injection molding even with an elevated melting point. However, if an aromatic polyamide with an excessively high melting point is used, the molding temperature is elevated, thereby tending to undergo yellowing. Therefore, it is preferable to use an aromatic polyamide having a melting point of 310° C. or less, and more preferably an aromatic polyamide having a melting point of 305° C. or less, and further more preferably an aromatic polyamide having a melting point of 300° C. or less. Further, the polyamide resin having the lower melting point tends to decrease the strength and rigidity because the number of amide bonds per unit molecular structure is reduced, thereby resulting in the form of a flexible chain. Therefore, it is preferable to use an aromatic polyamide having a melting point of 230° C. or more, and more preferably an aromatic polyamide having a melting point of 240° C. or more, and further more preferably an aromatic polyamide having a melting point of 250° C. or more.

In one embodiment of the polyamide resin composition suitable for the slider body according to the present invention, the proportion of the aromatic polyamide having the melting point of from 230 to 310° C. in the polyamide resin is 10% by mass or more. In order to further enhance the effect of improving the strength, the proportion of the aromatic polyamide having the melting point of from 230 to 310° C. in the polyamide resin is preferably 20% by mass or more, and more preferably 25% by mass or more. However, from the perspective of compatibility of the reciprocating opening and closing durability with the strength, the aliphatic polyamide as stated above should be a main component. Therefore, the proportion of the aromatic polyamide having the melting point of from 230 to 310° C. in the polyamide resin is preferably 40% by mass or less, and more preferably 35% by mass or less.

The melting point of such an aromatic polyamide is defined to be a temperature of an endothermic peak top when measuring an endothermic energy amount by DSC (differential scanning calorimetry). When using a plurality of aromatic polyamides, a temperature of an endothermic peak top on the highest temperature side is defined to be the melting point. Therefore, when using a plurality of aromatic polyamides, it will be measured as a melting point based on the aromatic polyamide having the highest melting point. However, even when using a plurality of aromatic polyamides, all the melting points of the respective polyamide resins are preferably within the range as discussed above.

The aromatic polyamides refer to polyamides having at least one aromatic ring in molecule, and are generally classified into those synthesized from aromatic diamines and aromatic dicarboxylic acids as raw materials, those synthesized from aromatic diamines and aliphatic dicarboxylic acids as raw materials, or those synthesized from aliphatic diamines and aromatic dicarboxylic acids as raw materials.

The aromatic diamines include m-xylylenediamine, p-xylylenediamine, m-phenylenediamine and p-phenylenediamine, and the like. The aliphatic diamines include linear or branched aliphatic diamines, such as, for example ethylenediamine, propylenediamine, butylenediamine, hexamethylenediamine, 2-methylpropanediamine, 3-methylpropanediamine, octamethylenediamine, decanediamine and dodecanediamine. The aromatic dicarboxylic acids include phthalic acid, terephthalic acid, isophthalic acid, naphthalenedicarboxylic acid, 2-chloroterephthalic acid, 2-methylterephthalic acid, 5-methylisophthalic acid, and 5-sodiumsulfoisophthalic acid and 1,5-naphthalenedicarboxylic acid, and the like. The aliphatic dicarboxylic acids include linear or branched aliphatic dicarboxylic acids, such as, for example, succinic acid, propanedioic acid, butanedioic acid, pentanedioic acid, adipic acid, heptanedioic acid, octanedioic acid, nonanedioic acid, decanedioic acid, dodecanedioic acid, undecanedioic acid, dimer acid, and hydrogenated dimer acid.

Specific examples of the aromatic polyamides include polyhexamethylene isophthalamide (PA6I), polyhexamethylene terephthalamide (PA6T), poly (m-xylyleneadipamide) (MXD6), poly (p-xylyleneadipamide) (PXD6), polybis(3-methyl-4-aminohexyl)methane terephthalamide (PACMT), polybis(3-methyl-4-aminohexyl)methane isophthalamide (PACMI), polytetramethylene terephthalamide (PA4T), polypentamethylene terephthalamide (PA5T), poly2-methylpentamethylene terephthalamide (M-5T), polyhexamethylene hexaterephthalamide (PA6T), polyhexamethylene hexahydroterephthalamide (PA6T(H)), poly2-methyloctamethylene terephthalamide, poly2-methyloctamethylene terephthalamide, polynonamethylene terephthalamide (PA9T), polydecamethylene terephthalamide (PA10T), polyundecamethylene terephthalamide (PA11T), polydodecamethylene terephthalamide (PA12T), polybis(3-methyl-4-aminohexyl)methane terephthalamide (PACMT), polybis (3-methyl-4-aminohexyl)methane isophthalamide (PACMI), and the like. These may be used alone or in combination with two or more.

The melting points of the polyamide resins vary depending on their molecular structures and molecular weights. Moreover, even if the molecular structure is identical, a different molecular weight may result in a different melting point. Therefore, the melting points of these aromatic polyamides can be adjusted by controlling their molecular weights. A higher molecular weight can increase the melting point, and conversely, a lower molecular weight can decrease the melting point.

Among the aromatic polyamides, MXD6 is preferred, for the reasons that it provides good strength even after water absorption and that its commercial product having the melting point in the range as described above are easily available. Therefore, of the aromatic polyamide components contained in the polyamide resin composition for the slider body, MXD6 preferably accounts for 90% by mass or more, MXD6 more preferably accounts for 95% by mass or more, and MXD6 further preferably accounts for 99% by mass or more, and MXD6 even more preferably accounts for 100% by mass.

<2-3 Reinforcing Fiber>

The strength of the slider body can be enhanced by incorporating reinforcing fibers into the polyamide resin composition. The specific manners and content of the reinforcing fibers overlap with those previously described in the paragraph of "1. Polyamide Resin Composition Suitable for Pull Tab". Therefore, only different points will be described below. The slider body has a larger size and complicated shape as compared with the pull tab, so that it is difficult for the orientations of the fibers to be aligned and it is possible to provide good improvement of strength by the reinforcing fibers without using a combination of reinforcing fibers having different fiber diameters. For example, reinforcing fibers each having a fiber diameter of from about 3 to 20 μm may be used, and reinforcing fibers each having a fiber diameter of from about 5 to 12 μm may be suitably used. Needless to say, the combination of reinforcing fibers having different fiber diameters may be used for the slider body, as discussed in the descriptions of the pull tab. However, in contrast to the pull tab, the slider rarely undergoes torsional forces (in-plane shear stress). Therefore, the slider preferably employs reinforcing fibers having the same fiber diameter which tend to align the orientations of fibers, rather than the combination of the reinforcing fibers having different fiber diameters, in terms of fluidity and mechanical properties. Also in the slider body, the total content of the polyamide resin and the reinforcing fibers in the polyamide resin composition is preferably 90% by mass or more, and more preferably 95% by mass or more, from the perspective of achieving the desired strength.

<2-4 Pigment and Other Additive>

Also for the slider body, color reproducibility can be enhanced by adding a pigment. The amount and type of the pigment used are as discussed in the descriptions of the pull tab and are thus omitted herein. As discussed above, in view of a solid dyeing property with the slider body in the one-bath dyeing process, the concentration of the pigment in the polyamide resin composition is preferably determined.

Besides, conventional additives such as heat stabilizers, weathering agents, hydrolysis resistant agents and antioxidants may be added to the polyamide resin composition, for example in a total amount of 10.0% by mass or less, and typically 5% by mass or less, and more typically 2% by mass or less.

(3. Slide Fastener)

The polyamide resin composition according to the present invention can be used as a material to produce various slide fastener components, which are assembled to form a slide fastener. More particularly, the polyamide resin described in the paragraph of "1. Polyamide Resin Composition Suitable for Pull Tab" can be used as a material to produce the pull tab by means of injection molding. Further, the polyamide resin composition described in the paragraph of "2. Polyamide Resin Composition Suitable for Slider Body" can be used as a material to produce the slider body by means of injection molding.

For other components for configuring the slide fastener, such as a pull tab cover, an upper stop, a bottom stop and elements, either the polyamide resin composition described for the pull tab or the polyamide resin composition described for the slider body can be appropriately selected and used in accordance with a required specification, or other composition may be employed.

In one embodiment of the slide fastener according to the present invention, a slider can be produced, which includes the pull tab made of the polyamide resin composition described in the paragraph of "1. Polyamide Resin Composition Suitable for Pull Tab", and further includes a slider body made of the polyamide resin composition described in the paragraph of "2. Polyamide Resin Composition Suitable for Slider Body". Further, a slide fastener including such a slider can be produced. Such a slider is advantageous for the slider overall strength or pull tab torsional strength after dyeing, while providing good reciprocating opening and closing durability.

Figure 2:
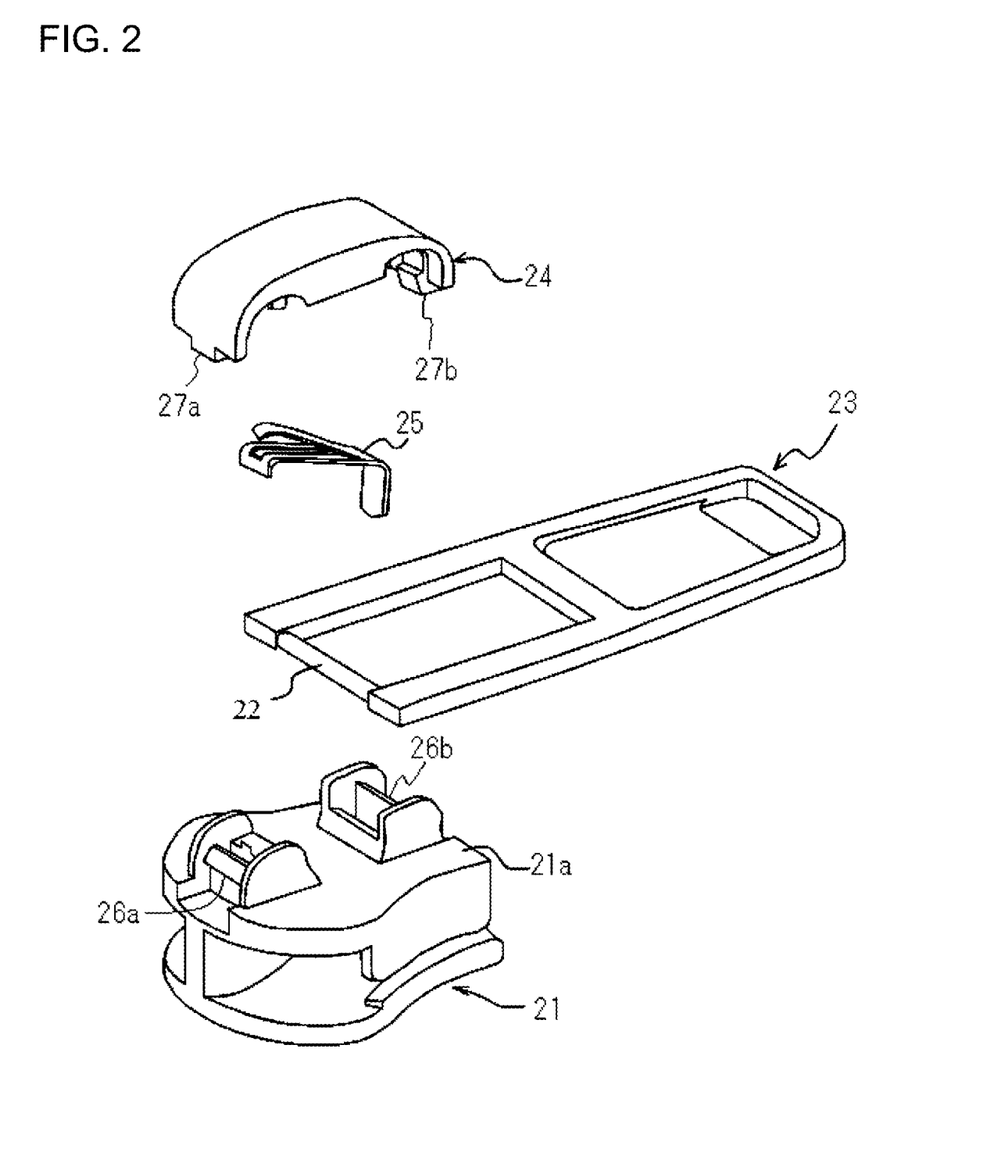
FIG. 2 is an exploded perspective view of one embodiment of a slider according to the present invention.
Figure 3:
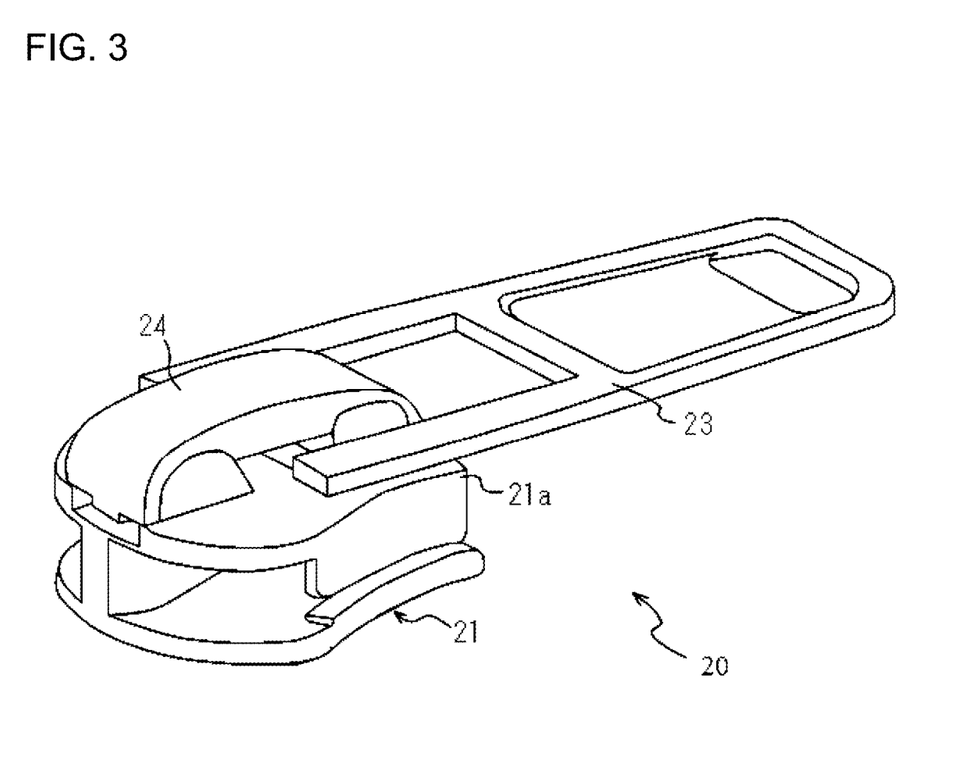
FIG. 3 is a perspective view of a slider formed by assembling the respective components shown in FIG. 2.

Structural examples of such a slider are shown in FIGS. 2 and 3. The slider 20 includes a slider body 21; a pull tab 23 which is connected to an upper blade plate 21a side of the slider body 21 and which will be held by the user when sliding and displacing the slider 20 in order to engage or separate element rows; and a pull tab cover 24 for interposing one end portion 22 of the pull tab 23 between the upper blade plate 21a and the pull tab cover, and rotatably holding the pull tab 2 at the one end portion 22 on the outer surface of the upper blade plate 21a. Further, an elastic plate-like member 25 made of a metal is interposed between the upper blade plate 21a and the pull tab cover 24, in order to impart an automatic stop function. The upper blade plate 21a and the pull tab cover 24 are connected by engaging a pair of claw portions 26a, 26b protruding from the outer surface of the upper blade plate 21a with a pair of claw portions 27a, 27b formed on the front and rear portions of the pull tab cover 24.

As materials of the elements to be combined with the slider, the polyamide resin as described above in the paragraph of "1. Polyamide Resin Composition Suitable for Pull Tab" is preferred from the perspective of mechanical strength such as chain crosswise strength and impact strength, but not limited thereto. The slide fastener may be constructed in combination with elements made of various materials such as thermoplastic polyether resins such as polyoxymethylene (POM); thermoplastic polyester resins such as polybutylene terephthalate (PBT); thermoplastic polyolefin resins such as polypropylene; thermoplastic polyvinyl resins such as polyvinyl chloride (PVC); and thermoplastic fluororesins such as ethylene tetrafluoroethylene.

Further, elements retaining higher strength even after dyeing may be provided by producing the elements made of the polyamide resin composition described in "1. Polyamide Resin Composition Suitable for Pull Tab". Then, as a material of the slider body to be combined with such elements, the polyamide resin composition described in the paragraph of "2. Polyamide Resin Composition Suitable for Slider Body" is preferred from the perspective of the reciprocating opening and closing durability, but not limited thereto. The slide fastener may be constructed in combination with a resin slider made of various materials such as thermoplastic polyether resins such as polyoxymethylene (POM); thermoplastic polyester resins such as polybutylene terephthalate (PBT); thermoplastic polyolefin resins such as polypropylene; thermoplastic polyvinyl resins such as polyvinyl chloride (PVC); and thermoplastic fluororesins such as ethylene tetrafluoroethylene; or a metal slider made of stainless steel, zinc, copper, iron, aluminum and alloys thereof.

The injection molding technique is known in the art and would not require any special explanation, but an example of the injection molding procedure is mentioned. First, the polyamide and the reinforcing fibers which are components for the resin composition are sufficiently kneaded so that there is no deviation of the components. The kneading can be carried out using a single-screw extruder, a twin-screw extruder and a kneader, and the like. When the resin composition after kneading is injection-molded using a mold having a predetermined fastener component shape, a slide fastener component in an undyed state is completed. When elements are prepared, they are generally injection-molded directly on the side edge of the fastener tape, such that a fastener stringer in which an element row is formed by attaching a plurality of elements to the side edge of the fastener tape can be produced. No particular limitation is imposed on the conditions for the injection molding, but the twin-screw extruder can be preferably used. In the case of glass fibers at a high concentration, it is desirable to use a side feeder to mix the glass fibers with a resin in a molten state, in view of productivity.

The undyed slide fastener components may be subjected to dyeing. A dyeing method is not particularly limited, but dip dyeing and printing are representative. Suitable dyes include, but not limited to, metal complex dyes, acid dyes, threne dyes and disperse dyes, and among these, more particularly, the acid dyes may be preferably used because they have good dyeing properties and fastness. The dyeing may be carried out simultaneously with or separately from other components of the slide fastener.

The fastener components according to the present invention may be subjected to various metal plating. The metal plating includes, but not limited to, for example, chromium plating, nickel plating, copper plating, gold plating, brass plating, other alloy plating and the like. The method of metal plating is not particularly limited, and may be carried out by, in addition to electroplating (electroless plating is preferably carried out before the electroplating), dry plating such as a vacuum deposition method, a sputtering method, an ion plating method, and the like, as needed. These methods may be combined. Among these, the electroplating method is preferred, which can securely cover the inside of the components which have small and complex shapes, and more preferably, the electroplating is carried out after preliminarily performing the electroless plating.

EXAMPLES

Examples of the present invention are illustrated below, but they are provided for better understanding of the present invention and its advantages, and are not intended to limit the present invention.

<1. Production of Pull Tab and Pull Tab Cover>

As polyamide resins for the pull tab and the pull tab cover, the following materials were prepared:

MXD6 (Tg: 102° C., water absorption rate: 5.5% (catalog value));

PA 6T/6I*1 (Tg: 125° C., water absorption rate: 7.0% (catalog value));

PA 612 (Tg: 60° C., water absorption rate: 3.0% (catalog value));

PA 6T/6I*2 (Tg: 140° C., water absorption rate: 6.5% (catalog value));

PA 66 (melting point: 265° C., Tg: 65° C., water absorption rate: 9.5% (catalog value)).

*1) A copolymer of PA 6T and PA 6I
*2) A copolymer of PA 6T and PA 6I

As reinforcing fibers, glass fibers (GF) having a fiber diameter of 11 µm, 9.5 µm and 6.5 µm were prepared, respectively.

As a white pigment, ZnS powder was prepared.

Each polyamide resin, the glass fibers and the white pigment were kneaded using a twin-screw extruder at each mixing ratio (mass basis) according to the test number as described in Table 1, and the resulting molten resin was then extruded into a strand and solidified in a cooling water bath, and the strand was then cut by a pelletizer to prepare pellets of each resin composition. The pellets were subjected to injection molding to produce a pull tab cover and a pull tab for a slide fastener having an M-class size (a chain width of 5.5 mm or more and less than 7.0 mm) as defined in JIS S3015:2007, and having the shape as shown in FIG. 2.

<2. Production of Slider Body>

PA 66 (a melting point: 265° C., Tg: 65° C., and water absorption rate: 9.5% (catalog value)), glass fibers (fiber diameter: 9.5 µm) and a white pigment (ZnS powder) were kneaded at each mixing ratio (mass basis) according to the test number as shown in Table 1 using a twin-screw extruder, and the resulting molten resin was then extruded into a strand and solidified in a cooling water bath, and the strand was then cut by a pelletizer to prepare pellets of each polyamide resin composition. The pellets were subjected to injection molding to produce a slider body for a slide fastener having an M-class size defined in JIS S3015, and having the shape as shown in FIG. 2.

<3. Assembly of Slider and Dyeing>

Using the pull tab, the pull tab cover and the slider body produced as described above, sliders each having the shape shown in FIG. 3 were assembled. Each slider was then dyed under the following conditions. Using a pot dyeing machine as a dyeing apparatus, each slider was dyed with a red acid dye "Tectilon RED 2B" under conditions of a dye concentration of 1.0 wt. %, a dyeing temperature of 100° C., and a dyeing time of 20 min.

<4. Test>

(Glass Transition Point (Tg) and Melting Point)

The glass transition point of each polyamide resin was measured using DSC (available from Seiko Instruments Inc.: EXTAR6000) based on the measurement method previously described, under the following conditions. Further, the melting point of PA 66 was measured under the same conditions.

sample amount: from 5 to 10 mg;
atmosphere: nitrogen gas;
temperature raising rate: 10° C./min;
range of measured temperature: from 0 to 350° C.;
reference pan: empty.

(MFR)

MFR was measured for each of the polyamide resin compositions for the pull tab under the measurement conditions as described above.

(Pull Tab Torsional Strength)

Each pull tab produced was subjected to a pull tab torsional test (JIS S3015: 2007) before and after dyeing each pull tab to measure torsional strength (maximum torque at break). An average value when 10 tests were performed was considered to be the measured value.

(Dyeability of Body and Pull Tab)

For each slider body and each pull tab after dyeing, a ΔE value (a numerical value of color difference) was determined with a spectrophotometer (CM-3700d available from Konica Minolta, Inc.). Further, a dyed state was visually observed. The dyeability was evaluated according to the following criteria:

○: (a single circle) for each pull tab, a color difference ΔE from the body after dyeing is 2 or less, and a b* value of Lab* values is 40 or more (bright red); and X (a cross): the above criteria are not satisfied.

<5. Test Results>

The results are shown in Table 1. The pull tabs of Examples 1 to 6 exhibited good toughness as well as excellent strength after dyeing. It was found that particularly in Examples 2, 4 and 5 where a small amount of PA 612 having a water absorption rate lower than that of MXD 6 was incorporated, a decrease in pull tab torsion strength after dyeing was suppressed as compared with Example 1. It was also found that in Examples 1 to 5 where the ratio of the white pigment added to the slider body to the white pigment added to the pull tab was optimized, the ΔE value was lower and the monochromatic dyeability was excellent. It should be noted that for the color of the pull tab before dyeing, Example 3 exhibited off-white color because PA 6T/6I having a higher glass transition point was used, and the other examples exhibited white color.

On the other hand, Comparative Example 1 used MXD 6 but did not incorporate glass fibers having a smaller diameter, so that the torsional strength of the pull tab after dyeing was poor as compared with that of Examples. Further, Comparative Example 1 incorporated an excessive high amount of the white pigment, so that the dyeability was poor.

In Comparative Example 2, the pull tab was not dyed because the Tg was too high. Also, the MFR was lower and the formability was deteriorated as compared with Examples. Comparative Example 3 incorporated a lower amount of MXD 6, so that excellent pull tab torsional strength could not be obtained. Comparative Example 4 incorporated only glass fibers having a smaller diameter, so that the MFR became extremely low and the pull tab could not be molded. Comparative Example 5 used only PA 66, the aliphatic polyamide, as the polyamide resin component, and did not incorporate the glass fibers having a smaller diameter, so that the pull tab torsional strength after dyeing was significantly decreased.

TABLE 1

| | | | Example 1 | Example 2 | Example 3 | Example 4 | Example 5 | Example 6 |
|---|---|---|---|---|---|---|---|---|
| Body | Polymer | PA66 (Melting Point = 265° C., Tg = 65° C., Water Absorption Rate = 9.5%) | 40% | 40% | 40% | 40% | 40% | 40% |
| | Reinforcing Fibers | GF (CS3G225S, φ9.5 μm) | 60% | 60% | 60% | 60% | 60% | 60% |
| | Pigment | ZnS | 1% | 1% | 1% | 0.5% | 1% | 0.5% |
| Pull Tab | Polymer | MXD6 (Tg = 102° C., Water Absorption Rate = 5.5%) | 50% | 45% | 40% | 45% | 40% | 50% |
| | | PA6T/6I (Tg = 125° C., Water Absorption Rate = 7.0%) | | | | 10% | | |
| | | PA612 (Tg = 60° C., Water Absorption Rate = 3.0%) | | 5% | | 5% | 10% | |
| | | PA6T/6I (Tg = 140° C., Water Absorption Rate = 6.5%) | | | | | | |
| | | PA66 (Tg = 65° C., Water Absorption Rate = 9.5%) | | | | | | |
| | Reinforcing Fibers | GF (φ11 μm) | 35% | 35% | 40% | 30% | 30% | 35% |
| | | GF (φ9.5 μm) | | | | | | |
| | | GF (φ6.5 μm) | 15% | 15% | 10% | 20% | 20% | 15% |
| | Pigment | ZnS | 2% | 2% | 3% | 2% | 2% | 3% |
| Physical Properties | | MFR of Pull Tab Material (g/10 min) | 14 | 18 | 15 | 11 | 10 | 14 |
| | | Before Dyeing Pull Tab Torsional Strength (N · cm) | 190 | 183 | 190 | 185 | 180 | 184 |
| | | After Dyeing Pull Tab Torsional Strength (N · cm) | 155 | 163 | 172 | 171 | 163 | 153 |
| | | After Dyeing Body/Pull Tab Dyeability | ○ | ○ | ○ | ○ | ○ | x |

| | | | Comparative Example 1 | Comparative Example 2 | Comparative Example 3 | Comparative Example 4 | Comparative Example 5 |
|---|---|---|---|---|---|---|---|
| Body | Polymer | PA66 (Melting Point = 265° C., Tg = 65° C., Water Absorption Rate = 9.5%) | 40% | 40% | 40% | 40% | 40% |
| | Reinforcing Fibers | GF (CS3G225S, φ9.5 μm) | 60% | 60% | 60% | 60% | 60% |
| | Pigment | ZnS | 2% | 1% | 1% | 0.5% | 1% |
| Pull Tab | Polymer | MXD6 (Tg = 102° C., Water Absorption Rate = 5.5%) | 50% | | 25% | 50% | |
| | | PA6T/6I (Tg = 125° C., Water Absorption Rate = 7.0%) | | | | | |
| | | PA612 (Tg = 60° C., Water Absorption Rate = 3.0%) | | | 25% | | |
| | | PA6T/6I (Tg = 140° C., Water Absorption Rate = 6.5%) | | 50% | | | |
| | | PA66 (Tg = 65° C., Water Absorption Rate = 9.5%) | | | | | 50% |
| | Reinforcing Fibers | GF (φ11 μm) | | 50% | 35% | | |
| | | GF (φ9.5 μm) | 50% | | | | 50% |
| | | GF (φ6.5 μm) | | | 15% | 50% | |
| | Pigment | ZnS | 4% | 2% | 3% | 2% | 2% |
| Physical Properties | | MFR of Pull Tab Material (g/10 min) | 20 | 5 | 9 | 2 | 11 |
| | | Before Dyeing Pull Tab Torsional Strength (N · cm) | 181 | 195 | 145 | — | 183 |
| | | After Dyeing Pull Tab Torsional Strength (N · cm) | 149 | 167 | 131 | — | 130 |
| | | After Dyeing Body/Pull Tab Dyeability | x | x | ○ | — | ○ |

DESCRIPTION OF REFERENCE NUMERALS 10 slide fastener
11 elongated tape
12 element
13 slider
14 top stop
15 opener 16 pull tab
17 pull tab cover
20 slider
21 slider body
21a upper blade plate
22 one end portion of pull tab
23 pull tab
24 pull tab cover
25 elastic plate-like member
26a, 26b claw portion of slider body
27a, 27b claw portion of pull tab cover

What is claimed is:

1. A polyamide resin composition for a slide fastener, comprising at least one polyamide resin and reinforcing fibers,
wherein a total mass of the polyamide resin and the reinforcing fibers accounts for 90% by mass or more of the composition;
wherein poly(m-xylylene adipamide) (MXD 6) accounts for 60% by mass or more of the polyamide resin;
wherein the reinforcing fibers account for from 45 to 70% by mass of the total mass of the polyamide resin and the reinforcing fibers;
wherein both first reinforcing fibers having a fiber diameter of from 5 to 7 μm and second reinforcing fibers having a fiber diameter larger than that of the first reinforcing fibers by more than 2 μm account for 90% by mass or more of the reinforcing fibers; and
wherein the first reinforcing fibers account for 20% by mass or more and less than 50% by mass of the reinforcing fibers.

2. The polyamide resin composition according to claim 1, wherein the polyamide resin further comprises an aliphatic polyamide having a water absorption rate lower than that of poly(m-xylylene adipamide) (MXD 6).

3. The polyamide resin composition according to claim 2, wherein the aliphatic polyamide having the water absorption rate lower than that of poly(m-xylylene adipamide) (MXD 6) accounts for from 5 to 20% by mass of the polyamide resin.

4. The polyamide resin composition according to claim 1, wherein poly(m-xylylene adipamide) (MXD 6) accounts for 85% by mass or more of the polyamide resin.

5. The polyamide resin composition according to claim 1, wherein the polyamide resin composition contains less than 4% by mass of a pigment relative to the total mass of the polyamide resin and the reinforcing fibers.

6. The polyamide resin composition according to claim 1, wherein the fiber diameter of the second reinforcing fibers is from 9 to 14 μm.

7. The polyamide resin composition according to claim 1, wherein all of the at least one polyamide resin in the polyamide resin composition have a glass transition temperature of lower than or equal to 120° C.

8. A slide fastener component made of the polyamide resin composition for the slide fastener according to claim 1.

9. The slide fastener component according to claim 8, wherein the slide fastener component comprises a pull tab.

10. The slide fastener component according to claim 8, wherein the slide fastener component is dyed.

11. A slide fastener comprising the slide fastener component according to claim 1.

12. The slide fastener according to claim 11, wherein the slide fastener comprises a slider body made of a polyamide resin composition comprising: at least one polyamide resin; and reinforcing fibers, wherein a total mass of the polyamide resin and the reinforcing fibers accounts for 90% by mass or more of the composition; wherein an aliphatic polyamide accounts for 60% by mass or more of the polyamide resin; and wherein the reinforcing fibers account for from 45 to 70% by mass of the total mass of the polyamide resin and the reinforcing fibers.

13. A slide fastener comprising:
a pull tab made of the polyamide resin composition for the slide fastener according to claim 1; and
a slider body made of a polyamide resin composition comprising at least one polyamide resin and reinforcing fibers, wherein a total mass of the polyamide resin and the reinforcing fibers accounts for 90% by mass or more of the composition; wherein an aliphatic polyamide accounts for 60% by mass or more of the polyamide resin; and wherein the reinforcing fibers account for from 45 to 70% by mass of the total mass of the polyamide resin and the reinforcing fibers.

14. The slide fastener according to claim 13, wherein each of the polyamide resin composition configuring the pull tab and the polyamide resin composition configuring the slider body contains less than 4% by mass of a pigment relative to the total mass of the polyamide resin and the reinforcing fibers; and wherein the slide fastener satisfies a ratio $P_1:P_2=1.5:1$ to $4:1$, in which $P_1$ represents a concentration of the pigment relative to the total mass of the polyamide resin and the reinforcing fibers in the polyamide resin composition configuring the pull tab; and $P_2$ represents a concentration of the pigment relative to the total mass of the polyamide resin and the reinforcing fibers in the polyamide resin composition configuring the slider body.

15. The slide fastener according to claim 13, wherein both the pull tab and the slider body are dyed.

* * * * *

UNITED STATES PATENT AND TRADEMARK OFFICE
CERTIFICATE OF CORRECTION

PATENT NO. : 10,717,830 B2
APPLICATION NO. : 16/094311
DATED : July 21, 2020
INVENTOR(S) : Kazuya Mizumoto et al.

It is certified that error appears in the above-identified patent and that said Letters Patent is hereby corrected as shown below:

In the Specification

In Column 5, Line 54, delete "w-amino" and insert -- ω-amino --, therefor.

In Column 5, Line 66, delete "w-amino" and insert -- ω-amino --, therefor.

In Column 6, Line 24, delete "w-amino" and insert -- ω-amino --, therefor.

In Column 12, Line 29, delete "(PAST)," and insert -- (PA5T), --, therefor.

In Column 12, Line 35, delete "(PAST)," and insert -- (PA9T), --, therefor.

Signed and Sealed this
Fifteenth Day of September, 2020

Andrei Iancu
*Director of the United States Patent and Trademark Office*